United States Patent
Lambert et al.

(10) Patent No.: US 9,782,761 B2
(45) Date of Patent: Oct. 10, 2017

(54) SELECTIVE CATALYTIC REDUCTION CATALYST

(71) Applicant: Ford Global Technologies, LLC, Dearborn, MI (US)

(72) Inventors: Christine Kay Lambert, Dearborn, MI (US); Justin Anthony Ura, Livonia, MI (US); Giovanni Cavataio, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 822 days.

(21) Appl. No.: 14/045,183

(22) Filed: Oct. 3, 2013

(65) Prior Publication Data
US 2015/0098870 A1    Apr. 9, 2015

(51) Int. Cl.
| | |
|---|---|
| B01J 29/06 | (2006.01) |
| B01J 29/80 | (2006.01) |
| F01N 3/20 | (2006.01) |
| B01D 53/86 | (2006.01) |
| B01D 53/94 | (2006.01) |
| B01J 35/04 | (2006.01) |
| B01J 37/02 | (2006.01) |
| B01J 35/00 | (2006.01) |
| B01J 29/76 | (2006.01) |

(52) U.S. Cl.
CPC .......... B01J 29/80 (2013.01); B01D 53/8628 (2013.01); B01D 53/9418 (2013.01); B01J 37/0244 (2013.01); F01N 3/2066 (2013.01); B01D 2255/20761 (2013.01); B01D 2255/50 (2013.01); B01D 2255/502 (2013.01); B01D 2255/904 (2013.01); B01D 2255/9022 (2013.01); B01D 2255/9032 (2013.01); B01J 29/763 (2013.01); B01J 29/7615 (2013.01); B01J 35/0006 (2013.01); B01J 35/04 (2013.01); B01J 37/0246 (2013.01); Y02T 10/24 (2013.01)

(58) Field of Classification Search
USPC .......... 502/60, 66, 67, 69, 74; 422/168, 169, 422/170, 171, 172
See application file for complete search history.

(56) References Cited

U.S. PATENT DOCUMENTS

| | | | | |
|---|---|---|---|---|
| 5,516,497 | A | * | 5/1996 | Speronello ......... B01D 53/9418 423/235 |
| 2008/0226545 | A1 | | 9/2008 | Bull et al. |
| 2009/0196812 | A1 | | 8/2009 | Bull et al. |
| 2009/0285737 | A1 | | 11/2009 | Bull et al. |
| 2011/0056187 | A1 | | 3/2011 | Seyler et al. |
| 2011/0182790 | A1 | | 7/2011 | Chandler et al. |
| 2011/0281720 | A1 | | 11/2011 | Andersen et al. |
| 2011/0300042 | A1 | | 12/2011 | Bull et al. |
| 2012/0014867 | A1 | | 1/2012 | Bull et al. |
| 2012/0189518 | A1 | | 7/2012 | Andersen et al. |
| 2012/0208691 | A1 | | 8/2012 | Bull et al. |
| 2012/0213673 | A1 | | 8/2012 | Andersen et al. |
| 2012/0275977 | A1 | | 11/2012 | Chandler et al. |
| 2012/0301381 | A1 | | 11/2012 | Fedeyko et al. |

FOREIGN PATENT DOCUMENTS

| | | |
|---|---|---|
| EP | 0393917 | 10/1990 |
| WO | 2008106519 | 9/2008 |
| WO | 2009099937 | 8/2009 |
| WO | 2010121257 | 10/2010 |
| WO | 2011045252 | 4/2011 |
| WO | 2012007914 | 1/2012 |

OTHER PUBLICATIONS

Acres et al. Catalysis 1981, vol. 4, 30 Pages, "The Design and Preparation of Supported Catalysts."
Lambert et al. SAE International Journals of Fuels and Lubricants Mar. 2010, vol. 2, No. 2, p. 167-175, "Post Mortem of an Aged Tier 2 Light-Duty Diesel Truck Aftertreatment System."
Wilken et al. Applied Catalysis B: Environmental 2012, vol. 111-112, p. 58-66, "Mechanistic investigation of hydrothermal aging of Cu-Beta for ammonia SCR."
Wang et al. Environmental Engineering Science 2009, vol. 26, No. 9, p. 1429-1434, "Selective Catalytic Reduction of NO by NH3 in Flue Gases over a Cu-V/Al2O3 Catalyst at Low Temperature."

* cited by examiner

*Primary Examiner* — Elizabeth Wood
(74) *Attorney, Agent, or Firm* — Damian Porcari; Brooks Kushman P.C.

(57) ABSTRACT

A selective catalytic reduction (SCR) catalyst includes a support layer. A copper-loaded chabazite (Cu/CHA) layer is supported on the support layer. A copper-loaded beta zeolite (Cu/beta) is supported on the Cu/CHA layer. The Cu/beta may be hydrothermally pre-aged prior to use of the SCR catalyst in a vehicle. The pre-aged Cu/beta is essentially free of phosphorous (P), calcium (Ca), zinc (Zn), sodium (Na), potassium (K), magnesium (Mg), iron (Fe), $CaSO_4$, $Ca_{19}Zn_2(PO_4)_{14}$, $CaZn_2(PO_4)_2$, ash, and/or soot.

16 Claims, 4 Drawing Sheets

SELECTIVE CATALYTIC REDUCTION CATALYST

TECHNICAL FIELD

One aspect of the present invention relates to SCR catalyst, in particular to a support layer having a copper-loaded beta zeolite layer and a copper-loaded chabazite layer.

BACKGROUND

Vehicle exhaust emissions of regulatory concern include oxides of nitrogen. The oxides of nitrogen include, but are not limited to, nitric oxide, NO, and nitrogen dioxide, $NO_2$. These compounds are frequently referred to as $NO_x$ as prescribed by the United States Environmental Protection Agency. Selective catalytic reduction (SCR) systems of $NO_x$ by nitrogen compounds, such as ammonia or urea, had been developed for various industrial applications. The application of SCR for mobile diesel engines requires overcoming several problems, including without limitation $NO_x$ reduction, $NO_x$ conversion at a wide temperature range, ammonia storage and ammonia slip. Ammonia emissions from SCR systems are known as ammonia slip. The ammonia slip increases at higher $NH_3/NO_x$ ratios. SCR technology is effective in reducing diesel $NO_x$ emissions to levels required by a number of future emission standards, but systems and process improvements are a need.

SUMMARY

Aspects of the present invention solve one or more problems of the prior art by providing in at least one embodiment, a selective catalytic reduction catalyst that has a lower ammonia storage capacity, higher $NO_x$ conversion efficiency at high temperature, and a more stable temperature response range. The selective catalytic reduction (SCR) catalyst includes a support layer. A copper-loaded chabazite layer (Cu/CHA) is supported on the support layer. A copper-loaded beta zeolite (Cu/beta) layer is supported on the Cu/CHA layer.

In another aspect, a selective catalytic reduction catalyst system is provided. The selective catalytic reduction catalyst system includes a first portion having a copper-loaded beta zeolite (Cu/beta). A second portion having a copper-loaded chabazite (Cu/CHA) downstream of the first portion. An exhaust gas line is disposed upstream of the first portion.

In another aspect, a selective catalytic reduction (SCR) catalyst includes an extruded copper-loaded chabazite (Cu/CHA) layer. A copper-loaded beta zeolite (Cu/beta) layer supported on the Cu/CHA layer.

BRIEF DESCRIPTION OF THE DRAWINGS

Exemplary embodiments will become more fully understood from the detailed description and the accompanying drawings, wherein.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

SCR systems generally have a catalyst material to remove $NO_x$ from a vehicle's engine exhaust and a filter to remove soot particles. Current SCR systems in production on U.S. medium-duty diesel trucks utilize a catalyst for $NO_x$ reduction using aqueous urea as a reductant. Chabazite catalysts have a high capacity to store ammonia at lower temperatures that may lead to ammonia slip at higher temperatures. There is also a lack of $NO_x$ conversion capability at temperatures typical of a filter regeneration (>500° C.) which occurs nominally every 500 miles. Beta type zeolites have a lower ammonia storage capacity, especially after exposure to high temperatures, which may negatively affect SCR catalyst efficiency. —Tailpipe $NO_x$ emissions during diesel particulate filter regeneration conditions are high because certain SCR catalysts have relatively low $NO_x$ conversion at high temperatures.

There are two principle techniques for removing carbonaceous soot particles:

1. combustion with oxygen ($O_2$)

[C]+$O_2$→$CO_2$ 2. combustion with nitrogen dioxide ($NO_2$)

[C]+$NO_2$→$CO_2$+NO

Generally, the temperature required for $O_2$-based regeneration requires temperatures above 500° C., and $NO_2$-based regeneration reaction occurs from 250° C.

Zeolites are microporous, aluminosilicate minerals which have been widely used as sorbants and catalysts (e.g., petroleum refining). The zeolite cage structure traps and holds hydrocarbon molecules at metal ion sites until precious metal catalyst in wash coat is hot enough to oxidize them. Beta zeolite consists of an intergrowth of two distinct structures termed Polymorphs A and B. The polymorphs grow as two-dimensional sheets and the sheets randomly alternate between the two. Both polymorphs have a three dimensional network of 12-ring pores.

Chabazite (CHA) is a small pore zeolite with 8 member-ring pore openings (~3.8 Angstroms) accessible through its 3-dimensional porosity (as defined by the International Zeolite Association). A cage like structure results from the connection of double six-ring building units by 4 rings. X-ray diffraction studies on cation locations in chabazite have identified seven cation sites coordinating with framework oxygens are located in the center of double six-membered ring, on or near the center of the six-membered ring in Chabazite cage, and around the eight-membered ring of the chabazite cage, respectively. See Mortier, W. J. "Compilation of Extra Framework Sites in Zeolites", Butterworth Scientific Limited, 1982, pl 1 and Pluth, J. J., Smith, J. V., Mortier, W. J., Mat. Res. Bull, 12 (1977) incorporated in its entirety.

In reference to SCR, beta zeolite has been traditionally applied to reduce $NO_R$. However, due to beta zeolite proclivity to store hydrocarbons in a SCR system, the automotive industry moved away from its use since stored hydrocarbons can create an exotherm and subsequently melt or fail the supporting structure. Consequently, the automotive industry adopted a different zeolite support, CHA zeolite, which has a smaller pore size and, thus, less hydrocarbon absorption and subsequent exotherm related SCR failures. However, at temperatures above 400° C., CHA zeolite drastically loses NO conversion efficiency. Moreover, the CHA catalyst suffers from a high capacity to store ammonia at lower temperatures that leads to ammonia slip at higher SCR operation temperatures. Another drawback of CHA catalyst is the lack of NO conversion efficiency at temperatures typical of SCR catalyst regeneration at temperatures above 500° C.

Under harsh hydrothermal conditions, for example, those exhibited during the regeneration of a soot filter with temperatures locally exceeding 600° C., the activity of many metal-promoted zeolites begins to decline. This decline is often attributed to dealumination of the zeolite and the consequent loss of metal-containing active centers within the zeolite.

The catalysts employed in the SCR process ideally should be able to retain good catalytic activity over the wide range of temperature conditions of use, for example, 200° C. to 600° C. or higher, under hydrothermal conditions.

In view of the above-described problems, in at least one embodiment of the present invention relates to a technology for purifying nitrogen oxides contained in exhaust gas exhausted from combustion engines such as diesel engines with ammonia and a selective catalytic reduction catalyst. An object of at least one embodiment of the present invention is to provide a selective catalytic reduction type catalyst which has a lower capacity to store ammonia, less ammonia slip at higher temperatures, and higher $NO_x$ conversion capability at temperatures typical of filter regeneration (>500° C.).

The following terms or phrases used herein have the exemplary meanings listed below in connection with at least one embodiment:

"Hydrothermally stable" means having the ability to retain a certain percentage of initial surface area and/or microporous volume after exposure to elevated temperature and/or humidity conditions (compared to room temperature) for a certain period of time. For example, in one embodiment, it is intended to mean retaining at least 60%, such as at least 70%, or even at least 80%, of its surface area and micropore volume after exposure to conditions simulating those present in an automobile exhaust, such as temperatures ranging up to 800° C.

"Initial Surface Area" means the surface area of the unaged zeolite (freshly made crystalline material) before exposing it to any aging conditions.

"Initial Micropore Volume" means the micropore volume of the unaged zeolite (freshly made crystalline material) before exposing it to any aging conditions.

"Defined by the Structure Commission of the International Zeolite Association," is intended to mean those structures included but not limited to, the structures described in "Atlas of Zeolite Framework Types," ed. Baerlocher et al., Sixth Revised Edition (Elsevier 2007), which is herein incorporated by reference in its entirety.

"Selective Catalytic Reduction" or "SCR" refers to the reduction of $NO_x$ (typically with ammonia, ammonia generating compound such as urea, or hydrocarbon) in the presence of oxygen to form nitrogen and $H_2O$. In other words, the reduction is catalyzed to preferentially promote the reduction of the $NO_x$ over the oxidation of ammonia by the oxygen, hence "selective catalytic reduction."

"Unaged Cu/beta" or "Fresh Cu/beta" refers to Cu/beta zeolite that is not pre-aged.

"Exhaust gas" refers to any waste gas formed in an industrial process or operation and by internal combustion engines, such as from any form of motor vehicle. Non-limiting examples of the types of exhaust gases include both automotive exhaust, as well as exhaust from stationary sources, such as power plants, stationary diesel engines, and coal-fired plants.

"$NO_x$" refers to emissions of regulatory concern include oxides of nitrogen. The oxides of nitrogen include, but are not limited to, nitric oxide, NO, and nitrogen dioxide, $NO_2$.

"Soot" refers to carbon containing particles from the incomplete combustion of hydrocarbons.

"Ash" refers to non-carbon containing particles.

"Particulate matter" refers to soot and ash.

Figure 1:
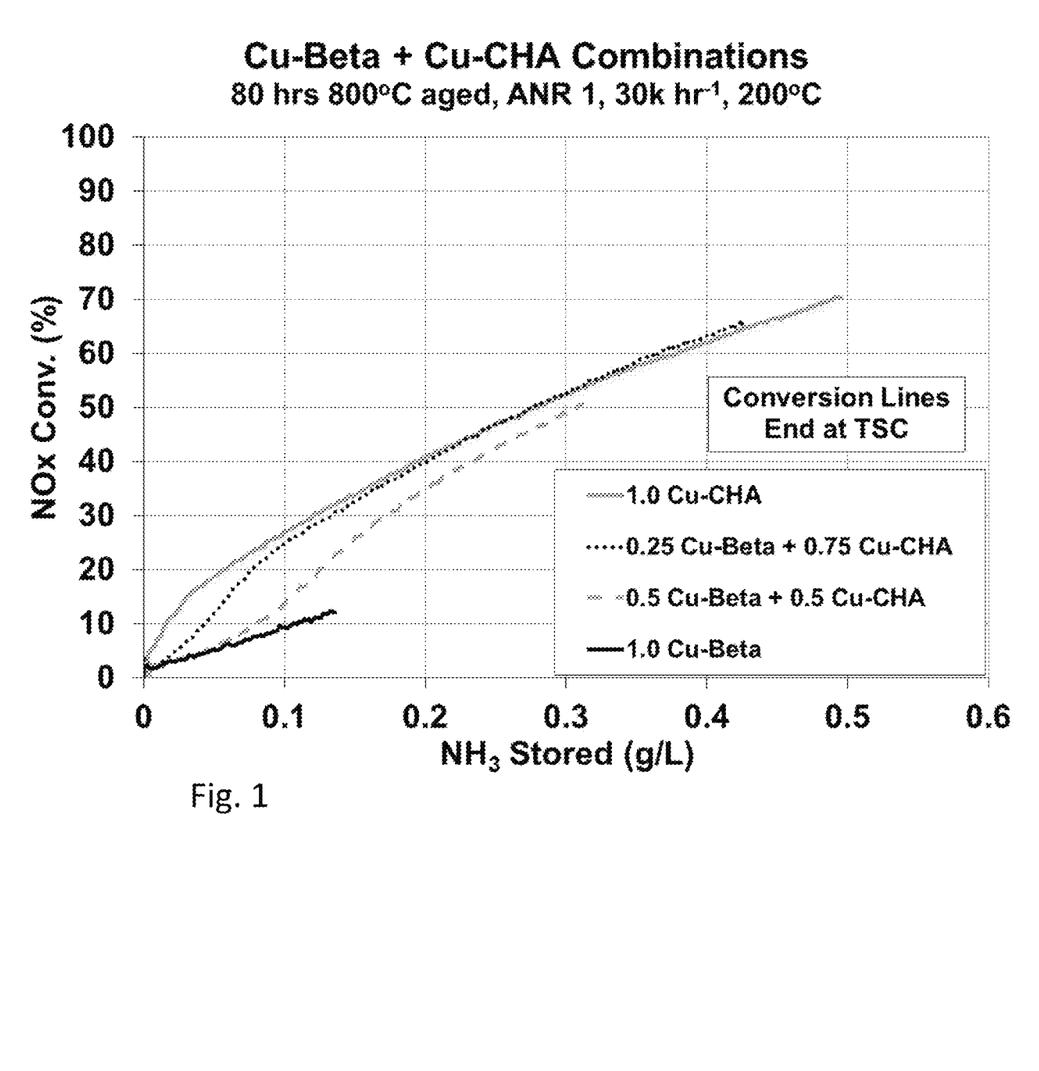
FIG. 1 is a graphical representation of various combinations of unaged Cu/beta with Cu-CHA.
Figure 2:
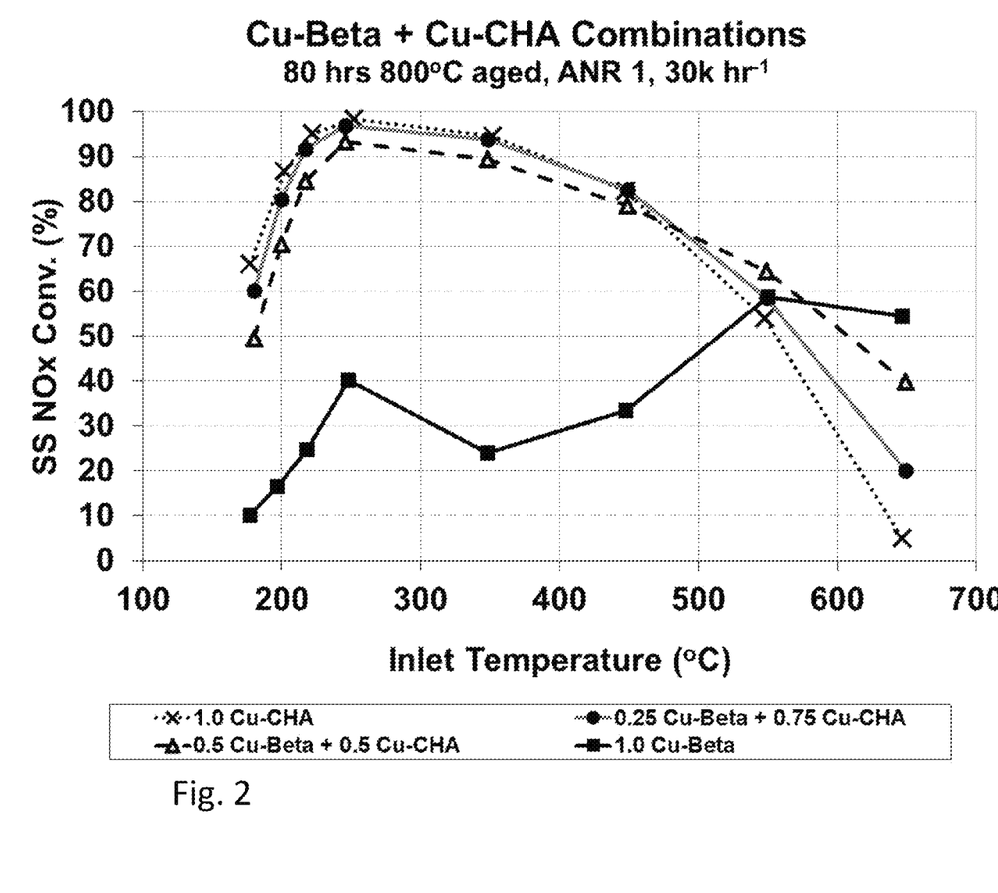
FIG. 2 is a graphical representation of various combinations of pre-aged Cu/beta with Cu-CHA.

To further reduce SCR failure and exotherm overheating, characteristics of Cu/beta were investigated. Referring to FIGS. 1 and 2, a pre-aged Cu/beta with Cu/CHA results in a striking improvement of the conversion of $NO_x$ under filter regeneration conditions (>500° C.). In some variations, the percentage of pre-aged Cu/beta in the SCR catalyst is, in increasing order of preference, 5, 10, 15, 25, 30, 35, 40, 45, and 50%. Pre-aging the Cu/beta is quite surprising to result in increased $NO_x$ conversion since beta zeolite exposure to high temperatures results in complex modifications of the zeolite structure. These changes may include modification of the chemical composition of the framework, formation of atomic vacancies and large cavities (a few hundred angstroms in diameter) in the framework, and finally slow and progressive collapse of the zeolite structure. These phenomena are known as the results from 'dealumination' of zeolite lattices. Above 500° C., aluminum atoms which are associated with protons are progressively extracted from their tetrahedral acidic sites and deposited in the pores in the form of oxyhydroxides, migrate and some recombine. The degree of dealumination is dependent on temperature. The empty aluminum atom vacancies may be filled by a local recrystallization of the zeolite framework or reoccupied by silicon atoms that migrate from either the noncrystalline fraction or the framework itself. The aluminum depletion corresponds to a decrease in the number of acidic sites which results in decreasing of activity. Thus, the removal of aluminum also results in lower ammonia storage capacity due to lower number of acidic sites.

Figure 3:
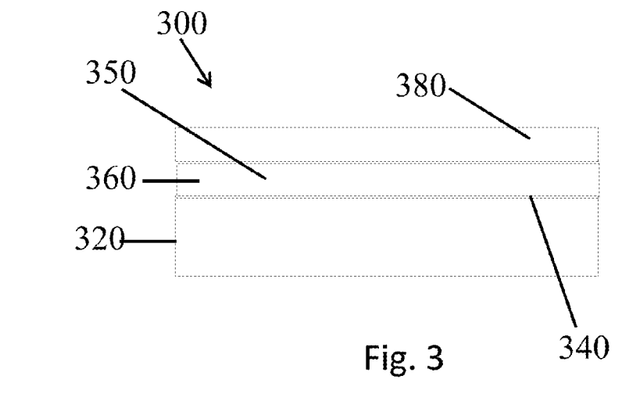
FIG. 3 is a schematic of a layered representation of a substrate with pre-aged Cu/beta and Cu/CHA in at least one embodiment.

With reference to FIG. 3, a SCR catalyst 300 includes a substrate support layer 320. The support layer 320 may include as non-limiting examples: metal, steel, ceramic, or zeolite. The support layer is well known and those skilled in the art understand the support layer serves as a physical support for the catalyst layers.

The support layer 320 supports a copper loaded chabazite (Cu/CHA) layer 360. The chabazite may be of natural form or synthetically made as defined by the Structure Commission of the International Zeolite Association. The natural or synthetic chabazite can be modified with one or more metal cations. Suitable metals include any redox active metal, including, but not limited to, copper, iron, and cobalt. In one embodiment, the copper is introduced into the microporous crystalline material by liquid-phase or solid ion-exchange or incorporated by direct-synthesis. One specific form of modified chabazite is copper loaded (Cu/CHA) with an overcoat or front zone of copper loaded beta zeolite.

As shown in FIG. 3, the support layer 320 has a first surface 340 that directly contacts the Cu/CHA layer 360. Alternatively, the first surface 340 may be positioned proximate to the Cu/CHA layer 360 without direct contact between the first surface 340 and the Cu/CHA 360 layer. For example, at least one inert layer of material in between the Cu/CHA layer 360 and the support layer 320. Non limiting examples include aluminum oxide, silicon dioxide, zirconium dioxide, ceramic, or inert atmosphere.

The Cu/CHA layer 360 is positioned in between the support layer 320 and a copper loaded beta zeolite, pre-aged Cu/beta layer 380. As shown in FIG. 3, the pre-aged Cu/beta layer 380 may directly contact the Cu/CHA 360 or be positioned proximate to the Cu/CHA 360 layer without direct contact. For example, at least one inert layer of material in between the Cu/CHA layer 360 and the pre-aged Cu/beta layer 380. Non limiting examples include aluminum oxide, silicon dioxide, zirconium dioxide, ceramic, or inert atmosphere. Moreover, inert materials may be used as inert binders for catalyst wash coats. Alternatively, the pre-aged Cu/beta 380 and Cu/CHA 360 catalysts could be wash-coated separately onto one ceramic honeycomb support 350. This configuration, FIG. 3, is advantageous in a space constrained application. Thus, by replacing part of the Cu/CHA catalyst with pre-aged Cu/beta, the ammonia storage capacity of the SCR system is effectively reduced. Moreover, a SCR catalyst combining pre-aged Cu/beta and Cu/CHA limits $NO_x$ conversion capability at catalyst temperatures below 350° C.

The Cu/CHA layer and pre-aged Cu/beta layer may have virtually any thickness, however, the thickness of the wash-coat layers is typically between 3 and 300 μm. Moreover, the thickness of the Cu/CHA layer and pre-aged Cu/beta layer can be independent of each other. The Cu/CHA layer and pre-aged Cu/beta layer can each independently be built up from several sub-layers to obtain the requisite $NO_x$ conversion efficiency and/or stable operational temperature range of the SCR system. The thickness and mass loading of each layer could be varied depending on the desired operating window. In at least one embodiment, pre-aged Cu/beta is present at 2.3 g/in$^3$. In some variations, the pre-aged Cu/beta is present, in increasing order of preference, 0.25, 0.50, 1.0, 1.5, 2.0, 2.5, 3.0, 4.0, 5.0, 6.0, 8.0, and 10 g/in$^3$. In at least one embodiment, Cu/CHA is present at 2.3 g/in$^3$. In some variations, the Cu/CHA is present, in increasing order of preference, 0.25, 0.50, 1.0, 1.5, 2.0, 2.5, 3.0, 4.0, 5.0, 6.0, 8.0, and 10 g/in$^3$.

In one or more embodiments, the Cu/CHA layer and the pre-aged Cu/beta layer are in a configuration to maximize surface area to react with the engine exhaust. The Brunauer-Emmett-Teller (BET) measurement reflects the physical adsorption of gas molecules on a solid surface and the measurement of the specific surface area of a zeolite catalyst. A higher BET surface area and pore volume is strongly related with the highly active performance of the catalyst, while a decrease in BET indicates catalyst plugging. The pre-aged Cu/beta has a BET surface area greater than about 120 m$^2$/g. In some variations, the pre-aged Cu/beta BET surface area is, in increasing order of preference 50, 75, 100, 120, 150, 175, 200, 250, 300, 400, and 500 m$^2$/g. BET surface area may be determined by obtaining 1 inch long core samples taken along a centerline axial position from the inlet, middle, and outlet of each catalyst component, and the surface area loss relative to the unaged catalysts being calculated. See Lambert, C., Cheng, Y., Dobson, D., Hangas, J. et al., "Post Mortem of an Aged Tier 2 Light-Duty Diesel Truck Aftertreatment System," *SAE Int. J. Fuels Lubr.* 2(2):167-175, 2010, incorporated in its entirety.

The amount of $NH_3$ that can be stored on the catalyst is important for its performance during SCR operation. A decrease in $NH_3$ storage indicates zeolite active sites are deactivated. By replacing part of the Cu/CHA catalyst with pre-aged Cu/beta, a lower ammonia storage capacity of the SCR system can be achieved. The storage of ammonia on pre-aged Cu/beta is expected to be at a maximum of 1300 mg/L in a newly manufactured catalyst with an inlet gas temperature approximately 100° C. Cu/CHA has a higher maximum storage capacity of nearly 3,000 mg/L. The ammonia storage capacity of pre-aged Cu/beta is typically greater than 1,000 mg/L at 200° C. having simulated diesel exhaust flowed through a sample core at space velocities 30 k h$^{-1}$, 10% $O_2$, 5% $H_2O$, and 350 ppm $NH_3$. For many SCR systems, a brief period of use (degreening) is needed to achieve a stable emissions reduction that allows representative testing. The degreening time period required varies for different technologies but is on the order of 0 to 50 hours. See Lambert, C., Cheng, Y., Dobson, D., Hangas, J. et al., "Post Mortem of an Aged Tier 2 Light-Duty Diesel Truck Aftertreatment System," *SAE Int. J. Fuels Lubr.* 2(2):167-175, 2010, incorporated in its entirety. Combining unaged Cu/beta with Cu/CHA lowers the ammonia storage capacity of the SCR system and limits the $NO_x$ conversion capability of lower vehicle exhaust operational temperatures.

The oxidation state of the copper loaded beta zeolite may influence the conversion efficiency of $NO_x$. For example a lower binding energy for Cu(I) species is expected (approximately 932.5 eV) as compared to Cu(II) species (933.7 eV). The unaged Cu/beta catalyst contains a $Cu^{2+}$ content of 35-40% as determined from X-ray photoelectron spectroscopy. In some variations, the unaged Cu/beta $Cu^{2+}$ content is, in decreasing order of preference, 15, 20, 25, 30, 35, 40, 45, 50, 55, 60, and 65%. The $Cu^{2+}$ content is expected to increase after exposure to temperatures above 500° C. See Wilken, Norman; Wijayanti, Kumia; Kamasamudram, K.; Currier, N. W.; Vedaiyan, R.; Yezerets, A.; Olsson, Louise, "Mechanistic investigation of hydrothermal aging of Cu-Beta for ammonia SCR", Applied Catalysis B: Environmental, 111 s. 58-66, herein incorporated in its entirety.

Any suitable physical form of the catalyst may be utilized, including, but not limited to: a channeled or honeycombed-type body; a packed bed of balls, pebbles, pellets, tablets, extrudates or other particles; microspheres; and structural pieces, such as plates or tubes. An important aspect of SCR catalyst function is to supply sufficient area for the required $NO_x$ removal, as the $NO_x$-ammonia reaction takes place upon the catalyst surface. Like various types of catalysts, support configuration forms such as honeycomb, plate-type, and corrugated have many advantages and disadvantages. The honeycomb form usually is an extruded ceramic applied homogeneously throughout the ceramic carrier or coated on the substrate. Plate-type catalysts have lower pressure drops and are less susceptible to plugging and fouling than the honeycomb types, but plate configurations are much larger and more expensive. Honeycomb catalyst provides the greater surface area of the two designs, but can be susceptible to fly ash fouling. Honeycomb configurations are smaller than plate types, but have higher pressure drops and plug much more easily. A third type is corrugated.

Figure 4:
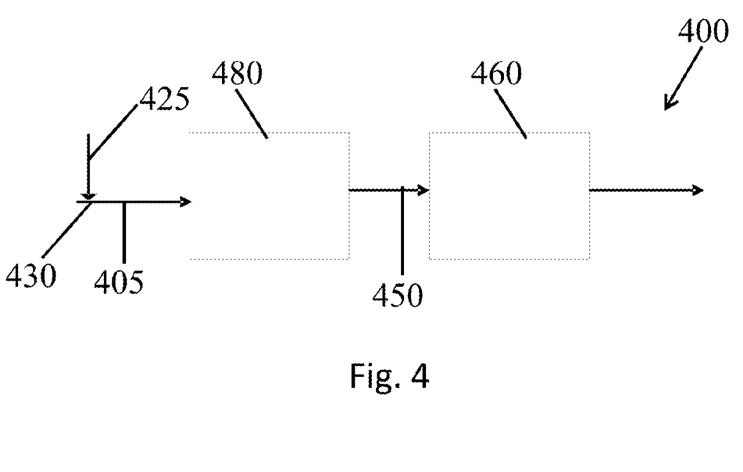
FIG. 4 is a schematic of a sequential representation of a multiple catalyst volume of pre-aged Cu/beta and Cu/CHA in at least one embodiment.

In an alternative embodiment referring to FIG. 4, the exhaust 405 may flow into a SCR catalyst 400 having two volumes, a pre-aged Cu/beta 480 and Cu/CHA 460. The first volume contains pre-aged Cu/beta 480 which the exhaust 405 flows through, exits, and continues through a passageway 450 before entering a second volume containing Cu/CHA 460. Medium to large pore zeolites containing metals are also known in the art for SCR of $NO_x$ using reductants, such as ammonia or urea. Urea may be injected into the exhaust system upstream of the catalyst as an aqueous solution at 32.5 weight-percent, a eutectic mixture with lowest possible freezing point. When heated with water, urea produces carbon dioxide and ammonia. In the presence of the catalyst, ammonia reacts with the various nitrogen oxides in the presence of oxygen to produce nitrogen gas and water. Urea may be incorporated through an injection line 425 which intersects the exhaust flow 405 through a junction 430 to form a gas mixture. The junction 430 may have a valve to control the amount and timing of injected ammonia or urea into the exhaust flow 405. In this configuration, the pre-aged Cu/beta 480 will have a low $NH_3$ adsorption, but with high temperature $NO_x$ conversion. The Cu/CHA catalyst 460 will have a high $NH_3$ adsorption, but low temperature $NO_x$ conversion.

Figure 5:
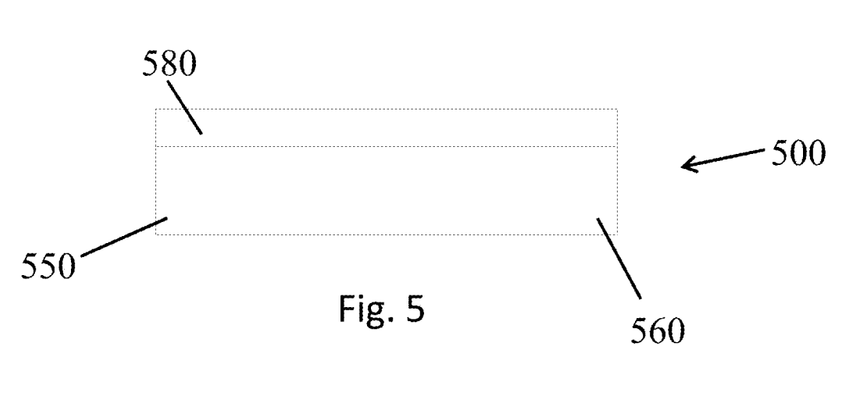
FIG. 5 is a schematic of a layered representation of a substrate with pre-aged Cu/beta and Cu/CHA in at least one embodiment.

In an alternative embodiment referring to FIG. 5 a SCR catalyst 500 will have pre-aged Cu/beta 580 that may be coated on a honeycomb substrate 550 consisting mainly of extruded Cu/CHA 560. This configuration has several advantages, including backpressure constraints and space considerations.

The pre-aging of the Cu/beta occurs prior to use of the SCR catalyst in vehicle. Aging of zeolites may be achieved through chemical, hydrothermal, or any other means known in the field. Hydrothermal aging is one of the easiest to replicate as it is based on time and temperature. The hydrothermal aging also known as steam aging or steam treatment of cracking catalyst. Structural changes of the catalyst caused by steam aging include reducing surface area, microporosity and crystallinity which are attributed to decreasing cracking activity and changing selectivity of the cracking catalyst. Hydrothermal aging may also be known as steam aging or steam treatment and may include ASTM Standard, D7206/D7206M-06(2013)e1 Standard Guide for Cyclic Deactivation of Fluid Catalytic Cracking (FCC) Catalysts with Metals, herein incorporated in its entirety. Moreover, variations of ASTM method D 4463-91 may be employed. The following references are incorporated in their entirety: Hydrothermal Synthesis of Different Structural Types of Zeolites, Apr. 25, 2013, Gunel Mamadova, ISBN-10: 3659365726; Catalyst Deactivation 2001: Proceedings of the 9th International Symposium, Lexington, Ky., Usa, 7-10 Oct. 2001, J. J. Spivey, ISBN-10: 0444543449; Progress in Catalyst Deactivation (NATO Advanced Study Institutes, Series E: Applied Sciences, No. 54), Jose Luis Figueiredo, ISBN-10: 9024726905. In the alternative, a laboratory hydrothermal aging protocol may consist of a flowing gas stream that is approximately 5% $H_2O$, approximately 10% $O_2$, and approximately 80 to 90% $N_2$, flowing through the catalyst core at a space velocity such as 30,000 $h^{-1}$ and the desired temperature. The desired temperature may range from 75 to 950° C. A reactor is utilized that combusts fuel to create synthetic exhaust gas flowing through the catalyst with the $H_2O$ and $O_2$ levels described above; the fuel may be doped with sulfur and phosphorous to simulate chemical poisoning. The pre-aging of a full size catalyst monolith may be performed in an oven that has flowing humid air (5% to 10% $H_2O$) or the catalyst is placed in an exhaust system on an engine dynamometer at a set speed and load to create the same conditions as the laboratory. All lab and dyno agings are accelerated to simulate the total time at high temperature over the full useful life of the catalyst resulting in aging times of about 60 to 80 hours. In the alternative, Cu/beta may be pre-aged with Cu/CHA since the maximum storage capacity of ammonia in Cu/CHA remains relatively stable after aging. Thus, the combination of pre-aged Cu/beta with Cu/CHA in a SCR system allows the conversion of $NO_x$ at filter regeneration temperatures and reduces the emissions penalty of $NO_x$ that occurs during filter regeneration.

In certain embodiments, pre-aged Cu/beta catalysts are distinguishable from in-vehicle-use Cu/beta catalyst in that the pre-aged Cu/beta, since the aging was accelerated and possibly only hydrothermal in nature, has reduced poisons from the fuel, exhaust, and upstream components. In vehicle use, a SCR catalyst is exposed to contaminants like soot and/or ash, iron from the exhaust manifold and piping, sulfur from the fuel and lubricant, and additional elements in the lubricant additives like phosphorous, sulfur, calcium and zinc. In at least one embodiment, a hydrothermally pre-aged Cu/beta SCR catalyst will be essentially free of ash, soot, particulate matter, and chemical poisons such as calcium (Ca), sodium (Na), potassium (K), magnesium (Mg), iron (Fe) and/or phosphorus (P). In another aspect the pre-aged Cu/beta catalyst may have ash, soot, particulate matter, calcium (Ca), sodium (Na), potassium (K), magnesium (Mg), iron (Fe) and/or phosphorus (P), wherein the relative concentration will be less than 0.05 weight percent. In some variations, the pre-aged Cu/beta catalyst has a percentage of calcium (Ca), sodium (Na), potassium (K), magnesium (Mg), iron (Fe), and/or phosphorus (P) less than, in decreasing order of preference, of 0.05, 0.01, 0.005, 0.001, 0.0005, 0.0001, and 0.00001 weight percent. Moreover, the concentration of ash, soot, particulate matter, calcium (Ca), sodium (Na), potassium (K), magnesium (Mg), iron (Fe) and/or phosphorus (P) in a hydrothermally aged catalyst will have a weight percent that does not deviate substantially over the length of the SCR catalyst like a vehicle aged catalyst. A substantial deviation of the weight percent is in the range of 0 to 30% and more preferable less than 1% to 15%.

In certain embodiments, vehicle-used-Cu/beta catalysts are distinguishable from pre-aged or unaged Cu/beta catalysts in that the vehicle-used-Cu/beta catalysts has 0.01% or more calcium (Ca), sodium (Na), potassium (K), magnesium (Mg), iron (Fe) and/or phosphorus (P) by weight. In some variations, the vehicle-used Cu/beta has a percentage of calcium (Ca), sodium (Na), potassium (K), magnesium (Mg), iron (Fe) and/or phosphorus (P) by weight is, in increasing order of preference, 1.0, 0.8, 0.4, 0.3, 0.2, 0.1, 0.05 and 0.01% by weight. In the alternative, the total calcium (Ca), sodium (Na), potassium (K), magnesium (Mg), iron (Fe) and phosphorus (P) percent by weight in the pre-aged Cu/beta is more than 0.4% by weight. In some variations, the pre-aged Cu/beta has a percentage of the total calcium (Ca), sodium (Na), potassium (K), magnesium (Mg), iron (Fe) and phosphorus (P) percent by weight is, in decreasing order of preference, 5.0, 2.0, 1.0, 0.8, 0.7, 0.6, 0.5, 0.3, 0.1, 0.05, 0.01, 0.001% by weight.

In diesel vehicles, the exhaust can contain a significant amount of ash, which can lead to catalyst abrasion and blockage, thereby increasing backpressure. These are significant problems when conventional coated catalysts (in which a relatively thin layer of catalyst is coated onto an inert substrate, such as the cordierite) are used. There are other options such as a plate catalyst, a coated steel substrate which is then shaped and stacked in a manner that optimizes catalytic activity to pressure drop. A second approach is to use extruded catalysts, in which the whole catalyst is made of active material. In these extruded catalysts if the top layer of catalyst is abraded away it simply reveals further active material below, which greatly increases catalyst longevity. A further benefit of using extruded catalysts is that they have a higher specific activity, since there is more effective catalyst volume per unit volume than is the case in conventional coated products.

SCR catalysts used in a vehicle may contain ash from flow through exhaust and upstream components. Ash accumulation in the SCR catalyst may result in plugging and can increase SCR pressure drop and decrease catalyst performance. Sulfur also deposits within the SCR catalyst but is removed regularly under filter regeneration conditions. Moreover, trapped soot in a vehicle aged SCR catalyst may be dissipated with SCR temperatures above 500° C.

The pre-aged Cu/beta, since it is thermally or chemically aged is essentially free of ash and/or soot trapped in the SCR catalyst. While a SCR catalyst aged through vehicle use may include ash and/or soot trapped in the SCR catalyst. Ash may include, but not limited to: $CaSO_4$, $Ca_{19}Zn_2(PO_4)_{14}$, and/or $CaZn_2(PO_4)_2$. In addition, a vehicle aged SCR catalyst may have some absorption or adsorption of different metals into the wash-coat such as calcium (Ca), sodium (Na), potassium (K), magnesium (Mg), iron (Fe) and/or phosphorus (P) in amounts typically less than 0.5 weight percent. In a vehicle aged SCR catalyst, there is usually a gradient of chemical poisoning that is closest to the gas exhaust inlet into the SCR catalyst and the chemical poisoning is lower at the SCR catalyst gas exhaust outlet. Thus, in another embodiment, vehicle-used-Cu/beta catalysts are distinguishable from pre-aged or unaged Cu/beta catalysts in that the vehicle-used-Cu/beta catalysts has a higher percent by weight of the above chemical poisons closer to the SCR inlet as compared to the SCR outlet. In one aspect, the SCR catalyst has a length of 0 to 100 arbitrary units, as defined from the exhaust inlet as position 0 and the exhaust outlet as position 100. In another aspect, a vehicle-used-Cu/beta catalyst will have an average weight percent deviation of greater than 5% of any ten consecutive arbitrary length units as compared to any other ten consecutive arbitrary length units. In another aspect a vehicle-used-Cu/beta catalyst is expected to have a deviation of several orders of magnitude as compared to average weight percent proximate to the SCR inlet as compared to the average weight percent proximate to the SCR outlet.

The pre-aged Cu/beta catalyst has BET surface area of at least 20% less than unaged Cu/beta. In some variations, the pre-aged Cu/beta catalyst has BET surface area in increasing order of preference 5, 10, 15, 20, 25, 30, 40, 50, 75, 90, 100, 150, 250, and 500% less than unaged Cu/beta. In another aspect, the pre-aged Cu/beta catalyst has a BET surface area of 20-100 m²/g. In some variations, the pre-aged Cu/beta has a BET surface area in increasing order of preference of 20, 30, 40, 50, 60, 70, 80, 90 and 100 m²/g.

The storage of ammonia on the pre-aged Cu/beta is expected to be at a maximum of 600 mg/L with an inlet gas temperature approximately 200° C. In some variations, the pre-aged Cu/beta has a maximum ammonia storage capacity in decreasing order of preference of 600, 550, 500, 450, 400, 350, 300, 250, 200 and 100 mg/L.

The $Cu^{2+}$ oxidation state of the pre-aged Cu/beta is at least 20% greater than unaged Cu/beta. In some variations, the $Cu^{2+}$ oxidation state of the pre-aged Cu/beta in increasing order of preference 20, 25, 30, 40, 50, 60, 70, 80, 100, 150, 250, and 500% greater than unaged Cu/beta. In the alternative, the $Cu^{2+}$ oxidation state of the pre-aged Cu/beta is 65% of the total Cu in the pre-aged Cu/beta. In some variations, the $Cu^{2+}$ abundance in the pre-aged Cu/beta is in increasing order of preference 45, 50, 55, 60, 65, 70 and 80%.

In at least one embodiment, the SCR of $NO_x$ conversion is directed to hydrothermally stable microporous zeolites using urea or ammonia, wherein the zeolites are copper loaded and the copper loaded zeolites retain at least 75% of its surface area and micropore volume after exposure to temperatures of up to 800° C. The copper of the copper loaded zeolites may comprise between 0 to 5% weight percent of the total weight of the zeolite. In some variations, the copper weight percent of the copper loaded zeolites is 0.1, 0.5, 1, 2, 3 and 4%.

In another embodiment, unaged Cu/beta may be substituted for pre-aged Cu/beta.

EXAMPLES

Example 1

Interestingly, referring to FIG. 1, by replacing part of the Cu/CHA catalyst with Cu/beta, the ammonia storage capacity of the SCR system is lowered. Referring to FIG. 1, the conversion of $NO_x$ at 200° C. and 30,000 h⁻¹ is plotted as a function of the amount of ammonia stored on the catalyst in g/L. The conversion lines end at the point of ammonia slip from the system. The Cu/beta sample itself is conversion limited and begins to slip very early on. The Cu/CHA sample has the highest storage capacity, achieves the highest $NO_x$ conversion and slips the latest. Combining Cu/beta with Cu/CHA lowers the ammonia storage capacity of the system and limits the $NO_x$ conversion capability at this very low temperature. Without being limited to any theory, it is believed the combination of Cu/CHA and Cu/beta in a layered format enhances $NO_x$ conversion. Cu/beta catalyst alone has ammonia slip at a low amount of stored $NH_3$, approximately 0.14 g/L and has a low $NO_x$ conversion of approximately 11% before ammonia slip. Cu/CHA catalyst alone has a higher $NH_3$ storage capacity 0.5 g/L before ammonia slip. The $NH_3$ stored in the SCR is at the threshold storage capacity (TSC) (e.g., the amount of $NH_3$ the SCR is capable of storing) of the SCR. Cu/CHA catalyst suffers from a high capacity to store ammonia at lower temperatures that later leads to ammonia slip at higher temperatures. There is also a lack of $NO_x$ conversion capability at temperatures typical of a filter regeneration (650° C.) which occurs nominally every 500 miles. Older SCR catalysts that consisted of Cu/beta type zeolite wash-coat had better high temperature performance than the current Cu/CHA and also had lower ammonia storage capacities.

Example 2

The next area of improvement is the conversion of $NO_x$ under filter regeneration conditions (>500° C.). Referring to FIG. 2, an experiment was conducted with varying amounts of Cu/beta and Cu/CHA in the system. The data were collected at steady-state conditions of 30,000/h space velocity with flowing gas containing 14% oxygen, 5% water, 5% carbon dioxide, 350 ppm NO, 350 ppm $NH_3$, and balance nitrogen. The catalysts were hydrothermally aged under similar conditions (without $NO_x$ and $NH_3$) at 800° C. for a total of 80 h. This aging is thought to represent 150,000 miles. The data shown in diamonds is for a system of all Cu/CHA. The operating window of high $NO_x$ conversion from 200-400° C. is ideal for most driving conditions. The data shown as squares is for a system of all Cu/beta. Very poor conversion was obtained for the entire operating window. However, the conversion of $NO_x$ at 650° C. is superior to the Cu/CHA sample. Replacing ¼ of the Cu/CHA with Cu/beta results in a slight improvement in conversion at T>500° C., while replacement of ½ of the Cu/CHA with Cu/beta has an even greater improvement. The ability to convert $NO_x$ at 650° C. would reduce the emissions penalty of $NO_x$ that occurs during filter regeneration.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A selective catalytic reduction (SCR) catalyst comprising:
   a support layer;
   a copper-loaded chabazite (Cu/CHA) layer supported on the support layer; and
   a pre-aged copper-loaded beta zeolite (Cu/beta) layer supported on the Cu/CHA layer and having a surface area at least 20% per unit volume less than the surface area of an un-aged Cu/beta.

2. The catalyst of claim 1, wherein the pre-aging occurs prior to use of the SCR catalyst in a vehicle.

3. The catalyst of claim 1, wherein the pre-aged Cu/beta is a hydrothermally and/or chemically pre-aged Cu/beta.

4. The catalyst of claim 1, wherein the pre-aged Cu/beta is essentially free of phosphorous (P).

5. The catalyst of claim 1, wherein the pre-aged Cu/beta is essentially free of calcium (Ca).

6. The catalyst of claim 1, wherein the pre-aged Cu/beta is essentially free of zinc (Zn).

7. The catalyst of claim 1, wherein the pre-aged Cu/beta is essentially free of sodium (Na), potassium (K), magnesium (Mg), and/or iron (Fe).

8. The catalyst of claim 1, wherein the pre-aged Cu/beta is essentially free of ash and/or soot.

9. The catalyst of claim 1, wherein the pre-aged Cu/beta is essentially free of $CaSO_4$, $Ca_{19}Zn_2(PO_4)_{14}$ and/or $CaZn_2(PO_4)_2$.

10. The catalyst of claim 1, wherein the pre-aged Cu/beta has an ammonia storage capacity of at least 20% less than an un-aged Cu/beta.

11. The catalyst of claim 1, wherein the pre-aged Cu/beta $Cu^{2+}$ content is at least 20% greater than an un-aged Cu/beta.

12. A selective catalytic reduction catalyst system comprising:
   a first portion having a pre-aged copper-loaded beta zeolite (Cu/beta) having an ammonia storage capacity of at least 20% less than an un-aged Cu/beta and a second portion having a copper-loaded chabazite (Cu/CHA) downstream of the first portion; and
   an exhaust gas line disposed upstream of the first portion.

13. The selective catalytic reduction catalyst system of claim 12 further comprising a connector disposed and fluidly connected between the first portion and the second portion.

14. The selective catalytic reduction catalyst system of claim 13, wherein the pre-aged Cu/beta is essentially free of phosphorous (P), calcium (Ca), zinc (Zn), sodium (Na), potassium (K), magnesium (Mg), iron (Fe), $CaSO_4$, $Ca_{19}Zn_2(PO_4)_{14}$, $CaZn_2(PO_4)_2$, ash, and/or soot.

15. A selective catalytic reduction (SCR) catalyst comprising:
   an extruded copper-loaded chabazite (Cu/CHA) layer; and
   a copper-loaded beta zeolite (Cu/beta) layer supported on the (Cu/CHA) layer and having a $Cu^{2+}$ content at least 20% greater than that of an un-aged Cu/beta.

16. The catalyst of claim 15, further comprising a ceramic honeycomb support to support the Cu/CHA layer.

* * * * *